(12) United States Patent
Kim (10) Patent No.: US 7,715,290 B2
(45) Date of Patent: May 11, 2010

(54) METHOD FOR CORRECTING WRITE STRATEGY DATA OF AN OPTICAL DISC AND OPTICAL DISC DRIVE USING THE SAME

(75) Inventor: Byung-jik Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 792 days.

(21) Appl. No.: 11/516,711

(22) Filed: Sep. 7, 2006

(65) Prior Publication Data

US 2007/0053269 A1    Mar. 8, 2007

(30) Foreign Application Priority Data

Sep. 7, 2005    (KR) ...................... 10-2005-0083428

(51) Int. Cl.
    *G11B 5/00* (2006.01)
(52) U.S. Cl. ............... 369/47.53; 369/53.35; 369/59.11
(58) Field of Classification Search ................ 369/47.5, 369/53.12, 59.11, 116, 47.53, 59.12
    See application file for complete search history.

(56) References Cited

U.S. PATENT DOCUMENTS

| | | | | |
|---|---|---|---|---|
| 7,301,883 | B1 * | 11/2007 | Balasubramanian et al. | 369/116 |
| 7,436,744 | B2 * | 10/2008 | Nakajo ..................... | 369/47.53 |
| 7,529,165 | B2 * | 5/2009 | Ushiyama et al. ........ | 369/47.53 |
| 7,529,169 | B2 * | 5/2009 | Nakajo ..................... | 369/59.12 |
| 2004/0190419 | A1 * | 9/2004 | Morioka .................. | 369/59.11 |
| 2005/0099925 | A1 | 5/2005 | Nakajo | |
| 2005/0270941 | A1 * | 12/2005 | Nakajo ..................... | 369/53.12 |
| 2006/0007819 | A1 * | 1/2006 | Nakajo ..................... | 369/47.5 |
| 2006/0158981 | A1 * | 7/2006 | Meinders et al. .......... | 369/47.5 |
| 2006/0176793 | A1 * | 8/2006 | Ushiyama et al. ........ | 369/47.53 |
| 2007/0072123 | A1 * | 3/2007 | Van Rompaey et al. | 430/270.11 |
| 2009/0252005 | A1 * | 10/2009 | Ushiyama et al. .......... | 369/47.5 |

FOREIGN PATENT DOCUMENTS

| | | |
|---|---|---|
| JP | 9-106545 | 4/1997 |
| JP | 2002-269744 | 9/2002 |
| JP | 2004-178797 | 6/2004 |
| KR | 2001-110086 | 12/2001 |

* cited by examiner

*Primary Examiner*—Thuy N Pardo
(74) *Attorney, Agent, or Firm*—Lee & Morse, P.C.

(57) ABSTRACT

A method for correcting write strategy data of an optical disc may include setting initial values, measuring and storing the width of a generated write enable signal, and calculating an offset correction value. The initial values may include a data write rate, a number of write strategy data, a maximum number of steps of a time parameter to be applied to the write strategy data, step sizes of the steps in the time parameter, and a generated modulated signal. A write enable signal may be generated whenever the time parameter is varied by a step size, and a width thereof may be measured and stored. The offset correction may be determined by calculating an offset correction value corresponding to a difference between the stored width of the write enable signal and a predetermined value of the write enable signal.

20 Claims, 7 Drawing Sheets

METHOD FOR CORRECTING WRITE STRATEGY DATA OF AN OPTICAL DISC AND OPTICAL DISC DRIVE USING THE SAME

BACKGROUND OF THE INVENTION

1. Field of the Invention

The present invention relates to a method of writing data on an optical disc. More particularly, the present invention relates to a method of correcting write strategy data by reflecting the electrical characteristics of each of a plurality of optical disc drives, and an optical disc drive performing the method.

2. Description of the Related Art

To correctly write data on an optical disc, the optical disc manufacturer should be known. This is because the optimum conditions for writing data on the optical disc depend on the optical disc manufacturer, who records the optimum conditions on a portion of the optical disc tracks. Data describing the optimum conditions are referred to as write strategy data. Accordingly, an optical write device used to write data on optical discs stores optimum write strategy data for every type of optical disc and writes data on optical discs using the optimum write strategy data in conjunction with the optimum conditions on the optical disc. Optical disc types may include compact discs (CDs) and digital versatile discs (DVDs).

Figure 1:
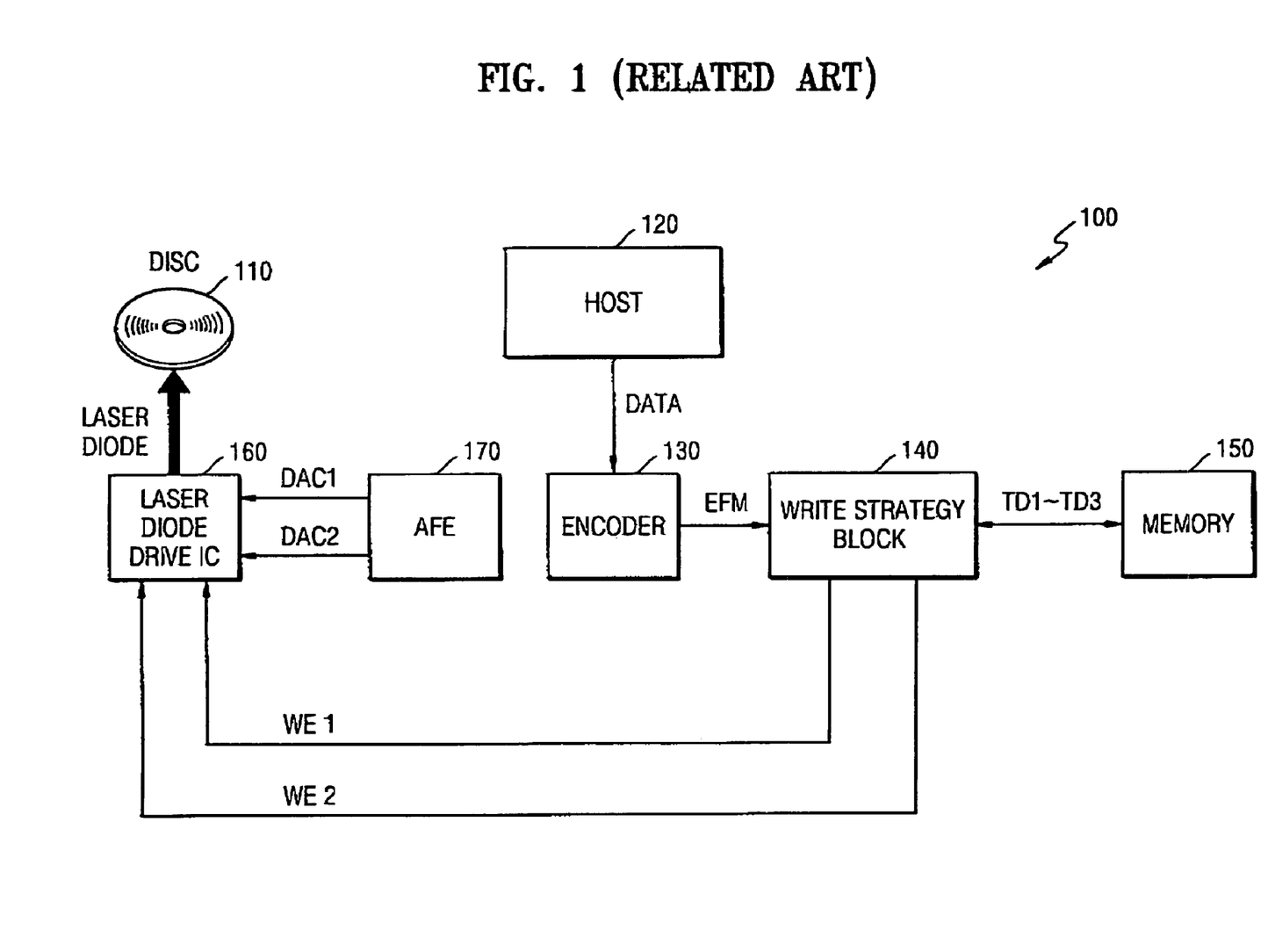
FIG. 1 illustrates a block diagram of a conventional optical disc drive of an optical write device.

FIG. 1 illustrates a block diagram of a conventional optical disc drive 100 of an optical write device. Referring to FIG. 1, the optical disc drive 100 may include an encoder 130, a write strategy block 140, a memory 150, a laser diode drive integrated circuit (IC) 160, and an analog front end (AFE) 170. An optical disc 110 and a host 120 are also illustrated for convenience of explanation.

The encoder 130 may receive data to be written on an optical disc 110 from the host 120, e.g., a personal computer, may eight-to-fourteen modulate (EFM) the received data, and may output the EFM data (EFM signal). The write strategy block 140 may output two write enable signals WE1 and WE2 using the EFM data and write strategy data TD1, TD2 and TD3 of the optical disc 110, stored in the memory 150. The write strategy data TD1, TD2 and TD3 are time parameters used to generate the two write enable signals WE1 and WE2. While three write strategy data TD1, TD2 and TD3 are shown in FIG. 1, more than three write strategy data may be used to generate more than two write enable signals. The time parameters are information representing when the two write enable signals WE1 and WE2 may be shifted to a logic high level or a logic low level, thus representing the relationship between the EFM data and the two write enable signals WE1 and WE2. This will be explained with reference to FIG. 2. The laser diode drive IC 160 may control a laser diode (see FIG. 2) using two current sources DAC1 and DAC2 provided by the AFE 170, and the two write enable signals WE1 and WE2.

Figure 2:
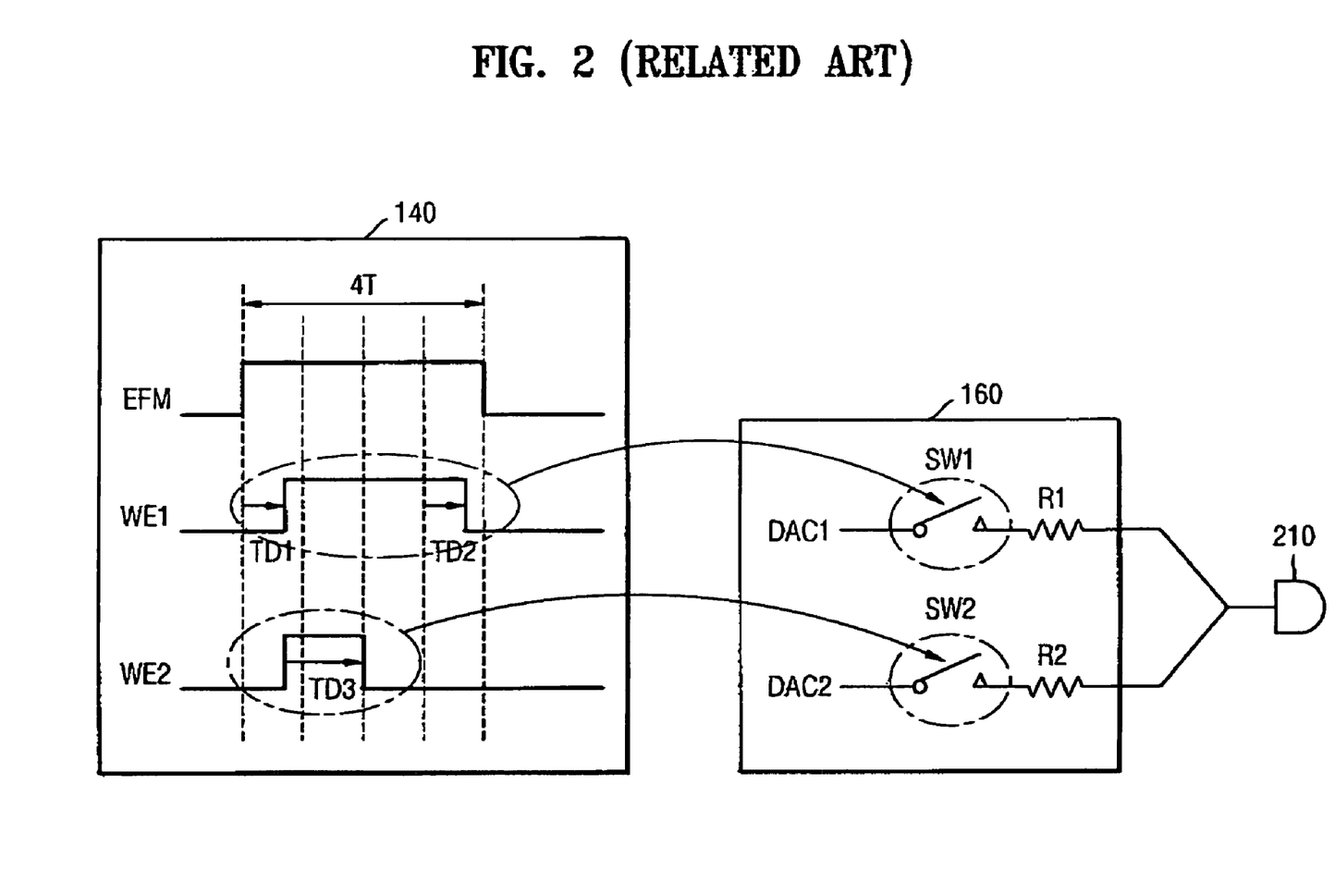
FIG. 2 illustrates the relationship between a write strategy block, a laser diode drive IC and a laser diode shown in FIG. 1.

FIG. 2 illustrates the relationship between the write strategy block 140, the laser diode drive IC 160 and a laser diode 210. The write strategy block 140 may generate the two write enable signals WE1 and WE2 using the signal EFM having information representing that effective data exists for a time 4T and the write strategy data TD1, TD2 and TD3 received from the memory 150. Here, T corresponds to one cycle of a system clock signal, and the time 4T is arbitrarily selected for convenience of explanation.

The first write enable signal WE1 may be generated using two write strategy data TD1 and TD2. The first write strategy data TD1 may correspond to a time period after the EFM signal is enabled, i.e., when the EFM signal goes from a logic low level to a logic high level. The second write strategy data TD2 may correspond to a time after the start of the fourth period of the time 4T in which the effective data of the EFM signal is disabled, but before the EFM signal is disabled. That is, the first write enable signal WE1 may go from a logic low level to a logic high level after the first write strategy data TD1, and may go from a logic high level to a logic low level after the second write strategy data TD2.

The second write enable signal WE2 may be enabled while the first write enable signal WE1 is enabled, i.e., while the first write enable signal WE1 maintains a logic high level. The third write strategy data TD3 may correspond to a time period during which the second write enable signal WE2 is enabled. While FIG. 2 shows that the enabled period of the second write enable signal WE2 corresponds to the front part of the enabled period of the first write enable signal WE1, the positions of the enabled periods of the first and second write enable signals may be changed using different write strategy data.

The laser diode drive IC 160 may include a first switch SW1, a first resistor R1, a second switch SW2 and a second resistor R2. The first switch SW1 may provide a current supplied from the first current source DAC1 to a first terminal of the first resistor R1 in response to the first write enable signal WE1. The first resistor R1 damps the current supplied from the first current source DAC1, and may provide the damped current to the laser diode 210, which is connected to a second terminal of the first resistor. The second switch SW2 may provide a current supplied from the second current source DAC2 to a first terminal of the second resistor R2 in response to the second write enable signal WE2. The second resistor R2 damps the current supplied from the second current source DAC2, and may provide the damped current to the laser diode 210, which is connected to a second terminal of the second resistor. However, the first and second resistors R1 and R2 may be omitted from the laser diode drive IC 160, such that outputs of the current sources are not damped.

In a period during which the first and second write enable signals WE1 and WE2 are simultaneously enabled, the laser diode 210 may be over-driven. Thus, the length and/or width of pits generated on the optical disc may vary, resulting in jitter.

As described above, even if write strategy data of every kind of optical disc manufactured by different manufacturers is stored, appropriately selected and used, not all problems that may arise when writing on an optical disc are solved.

The plurality of functional blocks 130, 140, 150, 160 and 170 shown in FIG. 1 may be part of a semiconductor device manufactured in a single chip or a system on chip (SOC). When semiconductor devices are mass-produced, they may have different electrical characteristics even when they are manufactured according the same specification. Furthermore, even if semiconductor device chips are produced from the same wafer, they may have electrical characteristics, even though they are considered normal if they conform to a particular specification.

For at least the above and other reasons, the same mass-produced optical disc drives may have different specifications. Accordingly, even when the same write strategy data is applied to optical discs manufactured by the same manufacturer, there may be differences between pits recorded on the optical discs due to the different specifications of the optical disc drives. This is because write strategy data is applied to optical discs without considering different specifications of individual optical disc drives.

That is, when write enable signals are generated using write strategy data and EFM signals corresponding to respective optical disc manufacturers, the write enable signals may vary for different optical disc drives. Accordingly, even when the same data is written on a plurality of optical discs manufactured by the same manufacturer using a plurality of optical disc drives manufactured by the same manufacturer, deviations may occur between data written on different optical discs.

SUMMARY OF THE INVENTION

The present invention is therefore directed to providing a method of correcting write strategy data of an optical disc and a drive using the same, which overcome one or more of the disadvantages of the related art.

It is therefore a feature of an embodiment of the present invention to provide a method for correcting write strategy data of an optical disc by reflecting electrical characteristics of an optical disc drive in the write strategy data.

It is therefore another feature of an embodiment of the present invention to provide an optical disc drive that reflects electrical characteristics thereof in write strategy data.

At least one of the above and other features and advantages of the present invention may be realized by providing a method for correcting write strategy data of an optical disc, the method including setting initial values including a data write rate, a number of write strategy data, a maximum number of steps of a time parameter to be applied to the write strategy data, and step sizes of the steps in the time parameter, and generating a modulated signal, generating a write enable signal whenever the time parameter is varied by a step size, and measuring and storing a width of the generated write enable signal, and calculating an offset correction value for correcting an offset value corresponding to a difference between the stored width of the write enable signal and a predetermined value of the write enable signal, wherein the write strategy data includes information about a difference between the modulated signal and the write enable signal, and the time parameter varies the information included in the write strategy data.

The write strategy data may be information about a time difference between the modulated signal and the write enable signal. The setting of the initial values may include setting the data write rate, generating the modulated signal, setting a number M (M is an integer) of the write strategy data, setting a maximum number N (N is an integer) of steps in the time parameter, and setting M step sizes S1 through SM for varying the time parameter, which are respectively applied to the M write strategy data.

The modulated signal may be an eight-to-fourteen modulated signal enabled between 3T through 11T for a CD and between 3T through 11T or 14T for a DVD, wherein T is a time period corresponding to one cycle of a system clock signal. The step sizes S1 through SM may be equal to or different from each other.

The measuring and storing the width of the write enable signal may include setting a first variable i to 1, setting a second variable j to 1, setting a value of a jth step of an ith time parameter, MTD(i,j), to 0, generating the write enable signal using the modulated signal and MTD(i,j), measuring the width of the write enable signal, storing the measured width of the write enable signal, setting the second variable j to j+1, determining whether the second variable j is larger than the maximum number N of time parameter steps, setting the value of the time parameter step MTD(i,j) to MTD(i,j+1)+S(i), where S(i) is the step size for ith time parameter, when the second variable j is less than or equal to N, and then returning to the generating the write enable signal, setting the first variable i to i+1 when the second variable j is larger than N, and determining whether the first variable i is larger than the number M of write strategy data, proceeding to store the offset correction value when the first variable i is greater than M and proceeding to set the second variable j to 1 when the first variable i less than or equal to M.

The calculating the offset correction value may include interpolating the stored width of the write enable signal, calculating an offset value corresponding to a difference between the width of the interpolated write enable signal and an ideal width of the write enable signal, and calculating the offset correction value using the offset value.

At least one of the above and other features and advantages of the present invention may be realized by providing an optical disc drive, including an encoder for outputting a modulated signal, a memory for storing write strategy data and a predetermined value of a write enable signal, and a write strategy block for generating a write enable signal corresponding to the modulated signal using a received plurality of control data and the write strategy data received from the memory, for calculating an offset value using the width of the generated write enable signal and the predetermined value of the write enable signal received from the memory, and for correcting write strategy data using the offset value, and for generating at least two write enable signals, wherein the corrected write strategy data includes information about a difference between the modulated signal and the write enable signal, and the write enable signal is generated using the modulated signal and the corrected write strategy data.

The offset value may correspond to a difference between the width of the generated write enable signal and an ideal width of the write enable signal received from the memory.

The plurality of control data may include a data write rate, a number of the write strategy data, a maximum number of steps of a time parameter to be applied to the write strategy data, and step sizes of the steps of the time parameter, wherein the time parameter varies information included in the write strategy data. The step sizes may be equal to or different from each other. The write strategy block may determine widths of the write enable signals for each time parameter iteratively in accordance with the step sizes.

The write strategy block may include a processor for generating the write enable signal corresponding to the modulated signal using the plurality of control data and the write strategy data, and an interpolator for interpolating the write enable signal received from the processor and outputting the interpolated write enable signal, the processor further calculating the offset value using information about the width of the interpolated enable signal received from the interpolator and the ideal width of the write enable signal.

At least one of the above and other features and advantages of the present invention may be realized by providing an article of manufacture having a machine-accessible medium including data that, when accessed by a machine, cause the machine to perform a method of correct write strategy data for recording data on an optical recording medium, the method including setting initial values including a data write rate to be applied to an optical write device, a number of write strategy data, a maximum number of steps of a time parameter to be applied to the write strategy data, and step sizes of the steps in the time parameter, and generating a modulated signal, generating a write enable signal whenever the time parameter is varied by a step size, and measuring and storing a width of the generated write enable signal, and calculating an offset correction value for correcting an offset value corresponding to a difference between the stored width of the write enable signal and a predetermined value of the write enable signal, wherein the write strategy data includes information about a difference between the modulated signal and the write enable signal, and the time parameter varies the information included in the write strategy data.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 10-2005-0083428, filed on Sep. 7, 2005, in the Korean Intellectual Property Office, and entitled: "Method for Correcting Write Strategy Data of Optical Disc and Optical Disc Driver Using the Same," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In accordance with embodiments of the present invention, write strategy data may be corrected for an individual optical disc drive.

Figure 3:
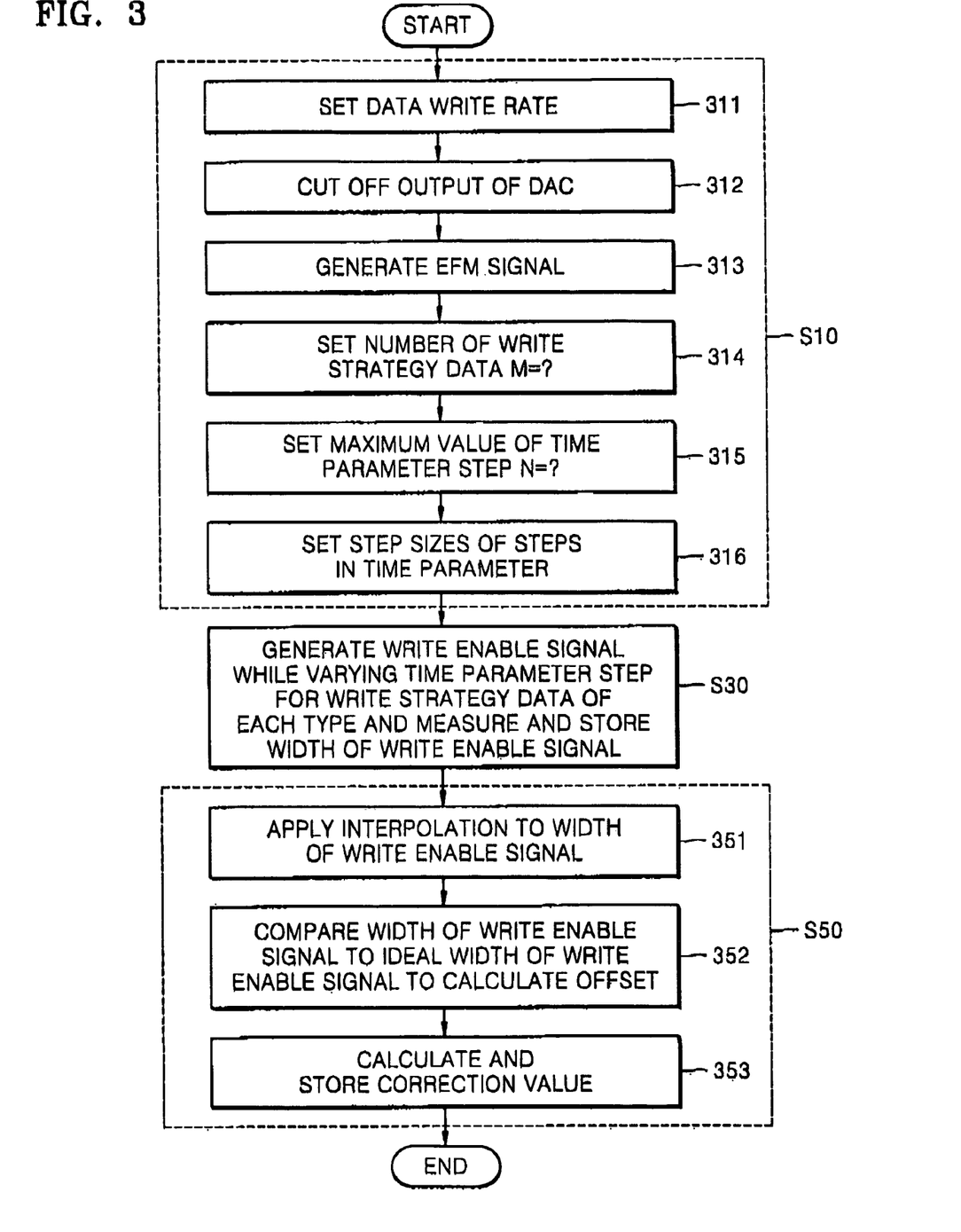
FIG. 3 illustrates a flow chart showing a method for correcting write strategy data of an optical disc according to an embodiment of the present invention.

FIG. 3 illustrates a flow chart of a method for correcting write strategy data of an optical disc according to an embodiment of the present invention. Referring to FIG. 3, the method may include a step S10 of setting initial values, a step S30 of measuring and storing the width of a generated write enable signal, and a step S50 of calculating and storing an offset correction value.

The initial value setting step S10 may set a data write rate to be applied to an optical write device, the number of write strategy data, the maximum number of steps of a time parameter to be applied to the write strategy data, and step sizes of the steps in the time parameter, and generates an EFM signal.

In step S30, a write enable signal may be generated whenever the time parameter is varied by a step size, and the width of the generated write enable signal is measured and stored.

In step S50 of calculating and storing an offset correction value, an offset correction value for correcting an offset corresponding to a difference between the stored width of the write enable signal and the ideal width of the write enable signal may be calculated and stored.

In more detail, as shown in FIG. 3, the initial value setting step S10 may include a step 311 of setting the data write rate, a step 312 of cutting off the output of a digital to analog converter (DAC) supplying a predetermined current to a laser diode drive integrated circuit (IC), a step 313 of generating the EFM signal, a step 314 of setting a number M, where M is an integer, of write strategy data, a step 315 of setting a maximum number N, where N is an integer, of time parameter steps, and a step 316 of setting M step sizes S1 through SM of respective time parameter steps in the time parameter steps used for the M write strategy data.

Figure 4:
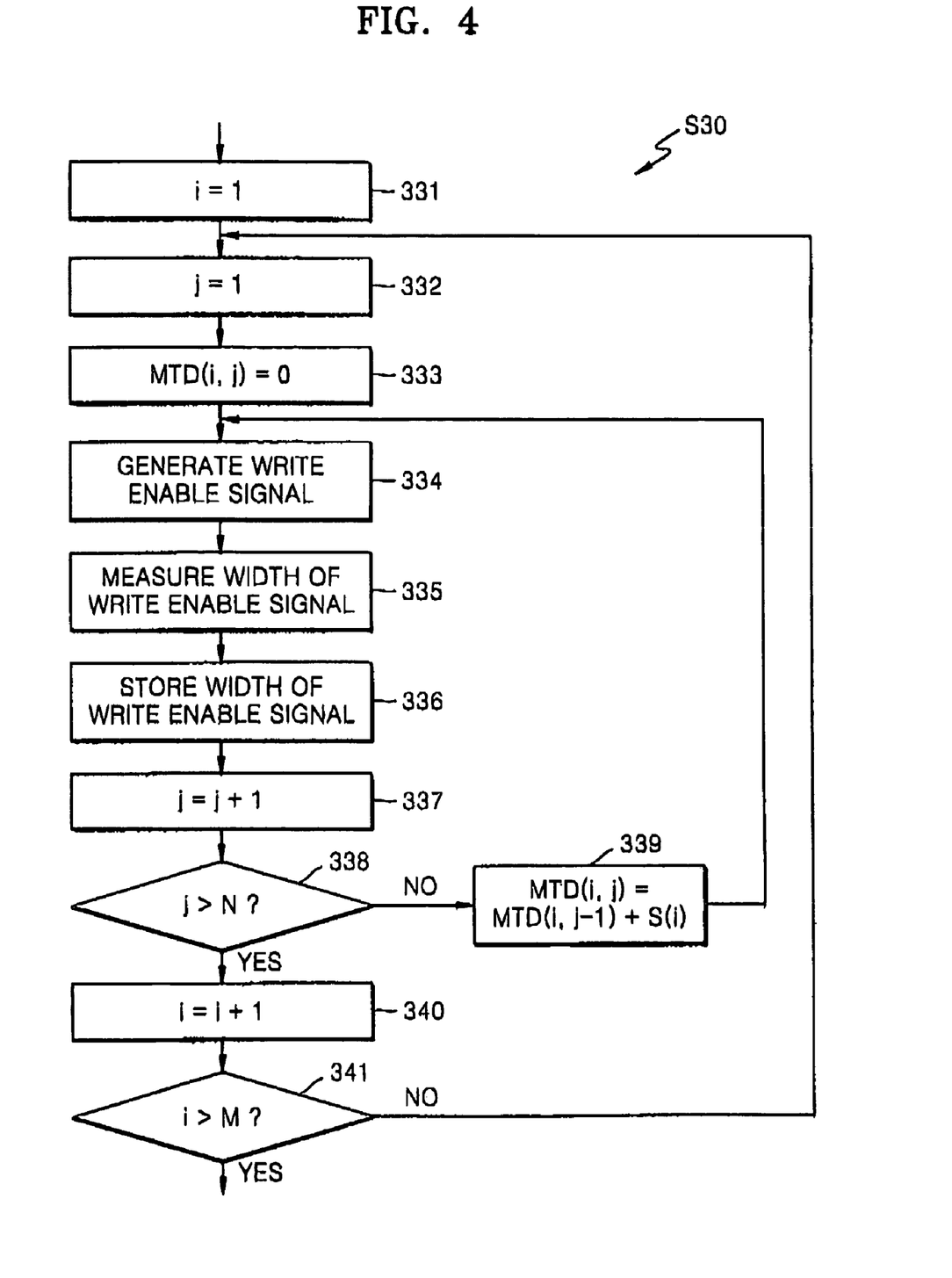
FIG. 4 illustrates a flow chart showing a process of measuring and storing widths of a write enable signal shown in FIG. 3.

FIG. 4 illustrates a flow chart of details of the step S30 of measuring and storing the width of the generated write enable signal according to an embodiment of the present invention. Referring to FIG. 4, the step S30 of measuring and storing the width of the generated write enable signal may include a step 331 of setting a first variable i to 1, a step 332 of setting a second variable j to 1, a step 333 of setting a value of a jth step of an ith time parameter, MTD(i,j), to 0, a step 334 of generating a write enable signal using the EFM signal and MTD(i,j), a step 335 of measuring the width of the generated write enable signal, and a step 336 of storing the measured width of the write enable signal.

Step S30 may further include a step 337 of incrementing the second variable j, e.g., setting j equal to j+1, a step 338 of determining whether the second variable j is larger than the maximum number N of time parameter steps, a step 339 of setting the value of a time parameter step MTD(i,j) to MTD(i,j+1)+S(i), where S(i) is a step size for the ith time parameter, when the second variable j is smaller than or equal to N and then returning to step 334 of generating the write enable signal, a step 340 of incrementing the first variable i, e.g., setting i to equal i+1, when the second variable j is larger than N, and a step 341 of determining whether the first variable i is larger than M, proceeding to step S50 of storing an offset correction value when the first variable i is larger than M, and resetting the second variable j to 1 when the first variable i is smaller than or equal to M.

Referring again to FIG. 3, step S50 may include a step 351 of applying interpolation to the stored width of the write enable signal, a step 352 of calculating the offset value corresponding to the difference between the width of the write enable signal to which the interpolation has been applied and the ideal width of the write enable signal, and a step 353 of calculating the offset correction value using the offset value and storing the offset correction value.

When T is a time period corresponding to one cycle of a system clock signal, the EFM signal may be enabled, e.g., between 3T through 11T for a CD and between 3T through 11T or 14T for a DVD. The write strategy data may include information about differences between the EFM signal and the write enable signal, particularly, information about a time difference between the EFM signal and the write enable signal. The time parameter is data for varying the information included in the write strategy data.

Each step size S(i) may be individually set. For example, a step size S1 may be allocated to the first write strategy data, a step size S2 may be allocated to the second write strategy data, . . . , and a step size SM may be allocated to the Mth write strategy data. Step sizes S1 through SM may all have the same value or different values.

The method for correcting write strategy data of an optical disc according to the present invention will now be explained in more detail with reference to FIGS. 1, 3 and 4.

First, a data write rate at which an optical write device writes data on an optical disc may be set and an EFM signal rate may be determined. For example, the data write rate may be ×4 through ×52 for a CD and ×2 through ×16 for a DVD.

While the method of correcting write strategy data is performed, currents applied to the laser diode drive IC 160 from the AFE 170 may be blocked to remove the effect of a pick-up and reduce a set correction time.

Then, a predetermined EFM signal for carrying out the method for correcting write strategy data is generated. To generate write enable signals WE1 and WE2 using the EFM signal, write strategy data that defines the time relationship between the EFM signal and the write enable signals WE1 and WE2 may be received from the memory 150.

To receive the write strategy data, the type of write strategy data should be known first. The type of write strategy data means the number of write strategy data defining the time relationship between the EFM signal and the write enable signals WE1 and WE2. The number of write enable signals is set to be M in this embodiment. Referring to FIG. 1, the write strategy data may include TD1, TD2 and TD3. For example, TD1 may be used when M is 1, TD1 and TD2 may be used when M is 2, and TD1, TD2 and TD3 may be used when M is 3. TD1, TD2 and TD3 may be set to time values provided by a manufacturer. The number of write strategy data is not fixed, but is variable such that it can be altered if required.

In accordance with an exemplary embodiment of the present invention, predetermined time parameter steps may be respectively applied to TD1, TD2 and TD3, write enable signals may be generated using the TD1, TD2 and TD3 to which the predetermined time parameter steps have been applied, instead of time values originally recorded in the TD1, TD2 and TD3, and the generated write enable signals may be compared to re-set optimized TD1, TD2 and TD3.

To perform this operation, the maximum number N of time parameter steps and a step size S(i) of a step variation in the time parameter are set. The step size S(i) may depend on the number M of write strategy data. For example, the time parameter step size to be applied to TD1 is S1 when M is 1, and the time parameter step size to be applied to TD2 is S2 when M is 2. The step size S(i) may be 1, 2 or more, and S1 and S2 may be equal.

As described above, when the number M of write strategy data, the maximum number N of time parameter steps, and the step sizes S(i) are set for the first through Mth step sizes, correction values for the first through Mth write strategy data TD1 through TDM may be sequentially calculated and stored. This operation may be carried out in steps S30 and S50.

The variable i used in step S30 may correspond to the number M of write strategy data and the variable j may correspond to the maximum number N of time parameter steps.

When i is 1, i.e., in the case of TD1, TD1 (1,1) may be 0 when j is 1. Accordingly, a write enable signal may be generated using the EFM signal and a time value 0 allocated to TD1 (1,1) in step 334, the width of the generated write enable signal may be measured in step 335 and may be stored in a memory in step 336.

In step 337, j is incremented by 1. In step 338, this new j value is compared to the maximum number N of time parameter steps. If j is less than or equal to N, the operation proceeds to step 339.

When i is 1 and j is 2, TD1 (1,2) may be set to a value obtained by adding S(1) to TD1(1,1) in step 339. For example, TD1(1,2) equals 1 when S(1) is 1. Here, a time value corresponding to 1 is determined by the frequency of the EFM signal. For example, the time value may be from a few nano seconds to tens of nano seconds. When the variable j is 2, a write enable signal may be generated using TD1(1,2) in step 334, the width of the generated write enable signal may be measured in step 335 and may be stored in the memory in step 336.

The aforementioned operation may be repeated as long as the variable j does not exceed the maximum number N of time parameter steps. By doing so, a maximum N values for the widths of write enable signals generated using the values allocated to TD1(1,1) through TD1(1,N) may be calculated and stored.

When the variable j exceeds the maximum number N of time parameter steps, the aforementioned operation is repeated for TD2 for which the variable i is increased by 1 in step 340. During this operation, a maximum N values for the widths of write enable signals generated using values allocated to TD2(2,1) through TD2(2,N) may be calculated and stored.

The aforementioned process may be repeated until the variable i exceeds M, as determined in step 341. When the variable i exceeds M, an offset correction value for correcting an offset value corresponding to a difference between the stored width of the write enable signal and the ideal width of the write enable signal may be calculated and stored in step S50.

In step S50, widths of a plurality of write enable signals generated for respective types of write strategy data stored in the memory may be interpolated in step 351. This is because the widths of the write enable signals obtained and stored according to the time parameter step may not be equal. A general average value of the widths of the write enable signals may be obtained without interpolating them. Otherwise, the widths of the write enable signals may be used as they are.

The widths of the interpolated write enable signals may be compared to the ideal width of the write enable signal according to the time parameter step and an offset value corresponding to a difference between them may be calculated in step 352. Correction values for the respective types of write strategy data may be calculated and stored in the memory in step 353.

When the write strategy data corrected through the aforementioned process is used, data writing problems caused due to differences between the electrical characteristics of different optical write drives may be reduced.

Figure 5:
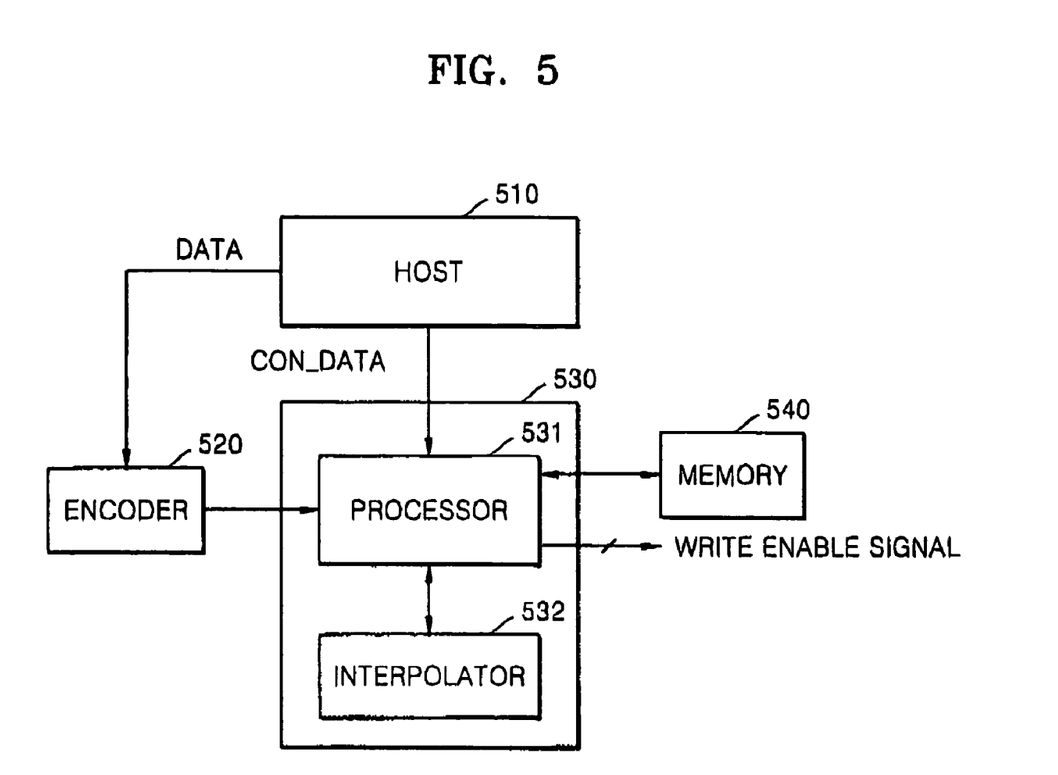
FIG. 5 illustrates a block diagram of an optical disc drive according to an embodiment of the present invention.

FIG. 5 illustrates a block diagram of an optical disc drive according to an embodiment of the present invention and a host 510, which may be external thereto. The optical disc drive may include an encoder 520, a write strategy block 530 and a memory 540.

Referring to FIG. 5, the encoder 520 may eight-to-fourteen-modulate (EFM) data DATA received from the host 510, e.g., a personal computer, and will be written on an optical disc, to generate an EFM signal.

The write strategy block 530 may generate a write enable signal corresponding to the EFM signal using a plurality of control data CON_DATA received from the host 510 and write strategy data received from the memory 540, may calculate an offset value using information about the width of the generated write enable signal and the ideal width of a write enable signal received from the memory 540, and may store write strategy data corrected using the offset value in the memory 540. The write strategy block 530 may generate at least two write enable signals. The memory 540 may store the write strategy data and the ideal width of the write enable signal.

The write strategy data may include information about a difference between the EFM signal and the write enable signal. The write enable signal may be generated using the EFM signal and the write strategy data. The offset value corresponds to the difference between the width of the generated write enable signal and the ideal width of the write enable signal received from the memory 540.

The plurality of control data CON_DATA may include a data write rate applied to an optical write device in which the optical disc drive is used, the number of write strategy data, the maximum number of steps of a time parameter to be applied to the write strategy data, and step sizes of the steps in the time parameter. The time parameter is data varying information included in the write strategy data.

The write strategy block 530 may include a processor 531 and an interpolator 532. The processor 531 may generate the write enable signal corresponding to the EFM signal using the plurality of control data CON_DATA and the write strategy data, calculate the offset value using information about the width of an interpolated write enable signal received from the interpolator 532 and the ideal width of the write enable signal, and store write strategy data corrected using the offset value in the memory 540. The interpolator 532 may interpolate the write enable signal received from the processor 531 and output the interpolated write enable signal.

The optical disc drive shown in FIG. 5 may execute the method for correcting write strategy data of an optical disc shown in FIGS. 3 and 4, so explanation thereof will not be repeated.

Figure 6:
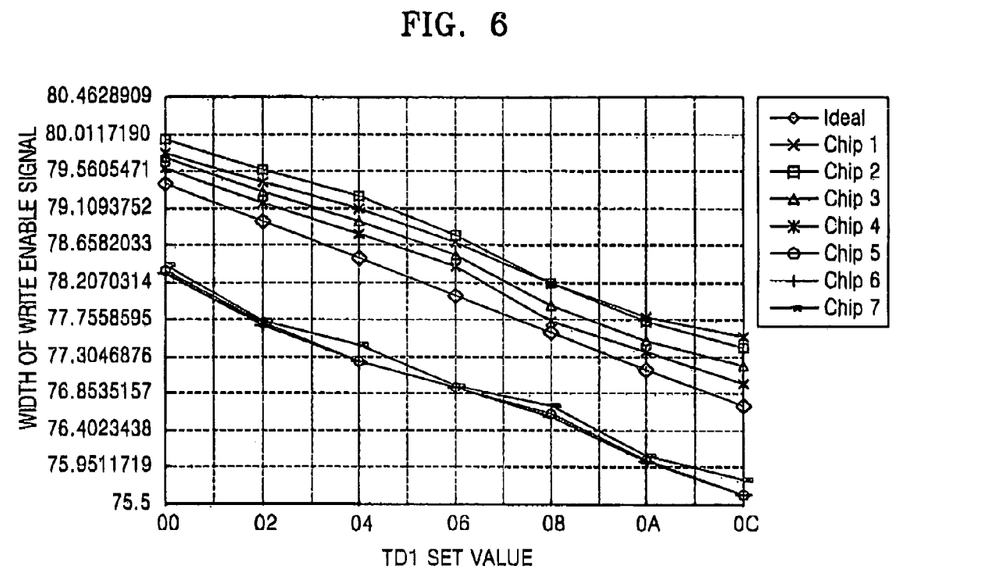
FIG. 6 illustrates a graph showing the width of a write enable signal in a plurality of chips, obtained while varying the first write strategy data.

FIG. 6 illustrates a graph of the width of a write enable signal in a plurality of chips obtained while changing the first write strategy data TD1. Referring to FIG. 6, the ideal width of the write enable signal is shown as a straight line in the middle of the graph. The X-axis represents a step value (in hexadecimal units) and the Y-axis represents the width of the write enable signal. In this case, the step size is 2. The width of the write enable signal decreases as the step value increases to increase TD1.

The offset value used in the present invention may be defined by differences between the ideal width of the write enable signal and a width of a write enable signal measured for an individual chip for a specific step value. Measured data for seven chips are shown in FIG. 6, and the differences between and among the measured widths of these seven chips may clearly be seen therein.

For example, when the step value is 4, the ideal width of the write enable signal s approximately 78.5, while the width of the write enable signal, e.g., of the fourth chip Chip4 is approximately 78.8. Thus, the absolute value of the offset value becomes about 0.3. When the step value is 8, the ideal width of the write enable signal is approximately 77.5, while the width of the write enable signal in the fourth chip Chip4 is approximately 77.7. Thus, the absolute value of the offset value becomes about 0.2. Therefore, selection of a single step value to correct the offset value is difficult, since the difference between the ideal width of the write enable signal and the width of the write enable signal in a chip depends on the step value. However, by assuming the relationship of the measured width and the ideal width is substantially constant, a correction value may be interpolated.

Figure 7:
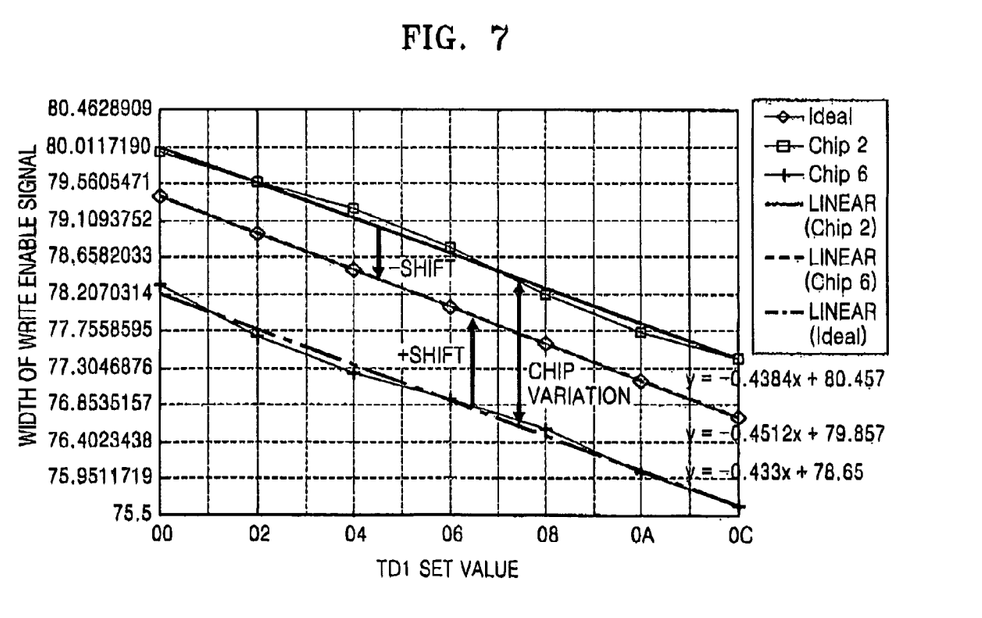
FIG. 7 illustrates a graph showing the result obtained by applying interpolation to second and sixth chips shown in FIG. 6.

FIG. 7 illustrates a graph of the result obtained by applying interpolation to the second and sixth chips Chip2 and Chip6 of FIG. 6. The ideal width of the write enable signal, the width of the write enable signal in the case of the second chip Chip2 and the width of the write enable signal in the case of the sixth chip Chip6, shown in FIG. 7, may be respectively represented by Equations 1, 2 and 3.

$$y=-0.4512x+79.857 \quad \text{[Equation 1]}$$

$$y=-0.4384x+80.457 \quad \text{[Equation 2]}$$

$$y=-0.433x+78.65 \quad \text{[Equation 3]}$$

A predetermined correction value that minimizes an offset between Equations 1 and 2 may be obtained by comparing the slope and intercept of Equation 1 to those of Equation 2. Similarly, a predetermined correction value that minimizes an offset between Equations 1 and 3 may be obtained by comparing the slope and intercept of Equation 1 to those of Equation 3. Similarly, a predetermined correction value for each of the seven chips that minimizes an offset between Equation 1 and a corresponding equation for that chip may be obtained by comparing the slope and intercept of Equation 1 to those of corresponding equation as determined form the measured write enable widths.

As shown in FIG. 7, a correction value for each chip may be easily obtained using the width of the interpolated write enable signal.

Figure 8:
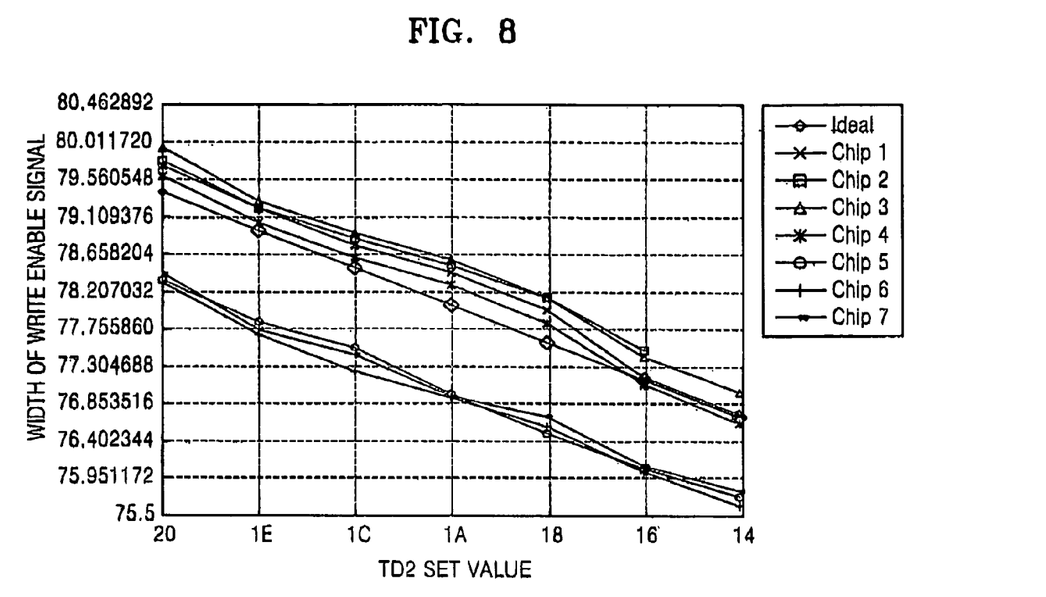
FIG. 8 illustrates a graph showing the width of a write enable signal in a plurality of chips, obtained while varying the second write strategy data.
Figure 9:
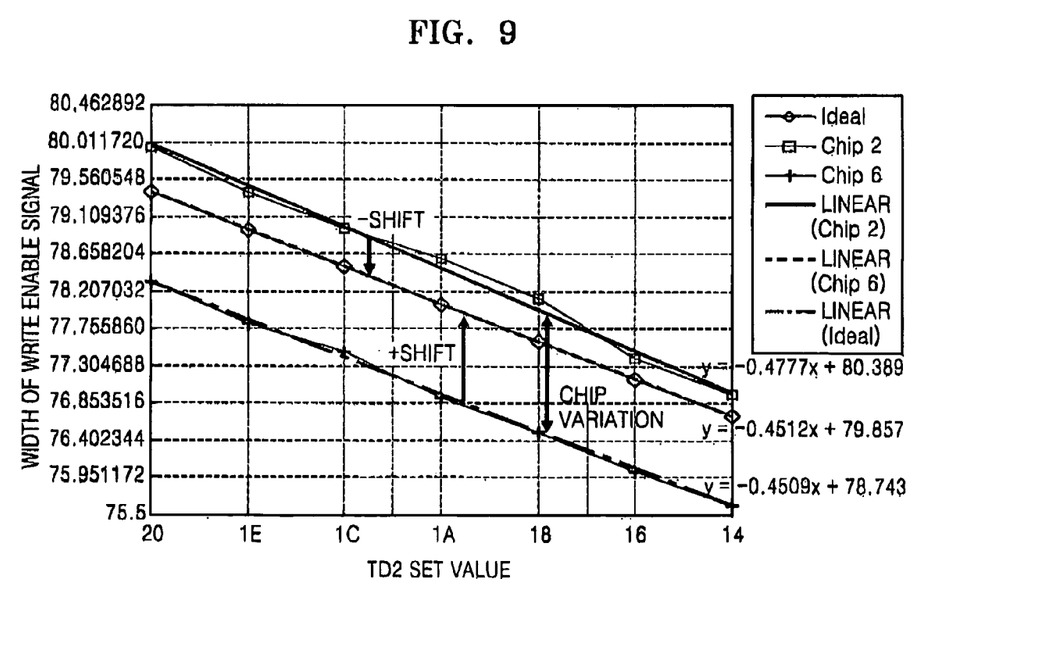
FIG. 9 illustrates a graph showing the result obtained by applying interpolation to second and sixth chips shown in FIG. 8.

FIG. 8 illustrates a graph showing the widths of write enable signals in a plurality of chips, obtained while varying the second write strategy data TD2. FIG. 9 is a graph showing the result obtained by applying interpolation to second and sixth chips Chip2 and Chip6 shown in FIG. 8. FIGS. 8 and 9 are similar to FIGS. 6 and 7, although the actual values of the slopes and intercepts for the chips may be different, and, thus, an explanation thereof is omitted.

As described above, in the method for correcting write strategy data of an optical disc and an optical disc drive using the method according to the present invention, the electrical characteristics of an individual optical disc drive may be reflected in the write strategy data. Accordingly, when the same data is written on a plurality of optical discs by a plurality of optical write devices including optical disc drives manufactured by a manufacturer different from the optical disc manufacturer, data may be correctly written.

Exemplary embodiments of the present invention have been disclosed herein, and although specific terms are employed, they are used and are to be interpreted in a generic and descriptive sense only and not for purpose of limitation. For example, the setting of a write strategy of the present invention may be implemented in software, e.g., by an article of manufacture having a machine-accessible medium including data that, when accessed by a machine, cause the machine to generate writing strategies in accordance with methods of the present invention. Accordingly, it will be understood by those of ordinary skill in the art that various changes in form and details may be made without departing from the spirit and scope of the present invention as set forth in the following claims.

What is claimed is:

1. A method for correcting write strategy data of an optical disc, the method comprising:

setting initial values including a data write rate, a number of write strategy data, a maximum number of steps of a time parameter to be applied to the write strategy data, and step sizes of the steps in the time parameter, and generating a modulated signal;

generating a write enable signal whenever the time parameter is varied by a step size, and measuring and storing a width of the generated write enable signal; and calculating an offset correction value for correcting an offset value corresponding to a difference between the stored width of the write enable signal and a predetermined value of the write enable signal, wherein the write strategy data includes information about a difference between the modulated signal and the write enable signal, and the time parameter varies the information included in the write strategy data.

2. The method as claimed in claim 1, wherein the write strategy data is information about a time difference between the modulated signal and the write enable signal.

3. The method as claimed in claim 1, wherein the setting of the initial values comprises:
setting the data write rate;
generating the modulated signal;
setting a number M (M is an integer) of the write strategy data;
setting a maximum number N (N is an integer) of steps in the time parameter; and
setting M step sizes S1 through SM for varying the time parameter, which are respectively applied to the M write strategy data.

4. The method as claimed in claim 3, wherein the modulated signal is an eight-to-fourteen modulated signal enabled between 3T through 11T for a CD and between 3T through 11T or 14T for a DVD, wherein T is a time period corresponding to one cycle of a system clock signal.

5. The method as claimed in claim 3, wherein the step sizes S1 through SM are equal to or different from each other.

6. The method as claimed in claim 3, wherein the measuring and storing the width of the write enable signal comprises:
setting a first variable i to 1;
setting a second variable j to 1;
setting a value of a jth step of an ith time parameter, MTD (i,j), to 0;
generating the write enable signal using the modulated signal and MTD(i,j);
measuring the width of the write enable signal;
storing the measured width of the write enable signal;
setting the second variable j to j+1;
determining whether the second variable j is larger than the maximum number N of time parameter steps;
setting the value of the time parameter step MTD(i,j) to MTD(i,j+1)+S(i), where S(i) is the step size for ith time parameter, when the second variable j is less than or equal to N, and then returning to the generating the write enable signal;
setting the first variable i to i+1 when the second variable j is larger than N; and
determining whether the first variable i is larger than the number M of write strategy data, proceeding to store the offset correction value when the first variable i is greater than M and proceeding to set the second variable j to 1 when the first variable i less than or equal to M.

7. The method as claimed in claim 1, further comprising cutting off power to a light source driver for writing data on the optical disk.

8. The method as claimed in claim 1, wherein the calculating the offset correction value comprises:
interpolating the stored width of the write enable signal;
calculating an offset value corresponding to a difference between the width of the interpolated write enable signal and an ideal width of the write enable signal; and
calculating the offset correction value using the offset value.

9. An optical disc drive, comprising:
an encoder for outputting a modulated signal, the modulated signal including initial values that include a data write rate, a number of write strategy data, a maximum number of steps of a time parameter, and step sizes of the steps in the time parameter;
a memory for storing write strategy data and a predetermined value of a write enable signal; and
a write strategy block for generating a write enable signal corresponding to the modulated signal using a received plurality of control data and the write strategy data received from the memory, for calculating an offset value using the width of the generated write enable signal and the predetermined value of the write enable signal received from the memory, and for correcting write strategy data using the offset value, and for generating at least two write enable signals,
wherein the corrected write strategy data includes information about a difference between the modulated signal and the write enable signal, and the write enable signal is generated using the modulated signal and the corrected write strategy data.

10. The optical disc drive as claimed in claim 9, wherein the write strategy block further stores the corrected write strategy data in the memory.

11. The optical disc drive as claimed in claim 9, wherein the offset value corresponds to a difference between the width of die generated write enable signal and an ideal width of the write enable signal received from the memory.

12. The optical disc drive as claimed in claim 9, wherein the plurality of control data comprise:
a data write rate;
a number of the write strategy data;
a maximum number of steps of a time parameter to be applied to the write strategy data; and
step sizes of the steps of the time parameter,
wherein the time parameter varies information included in the write strategy data.

13. The optical disc drive as claimed in claim 12, wherein the step sizes are equal to or different from each other.

14. The optical disc drive as claimed in claim 12, wherein the write strategy block determines widths of the write enable signals for each time parameter iteratively in accordance with the step sizes.

15. The optical disc drive as claimed in claim 9, wherein the write strategy block comprises:
a processor for generating the write enable signal corresponding to the modulated signal using the plurality of control data and the write strategy data; and
an interpolator for interpolating the write enable signal received from the processor and outputting the interpolated write enable signal,
the processor further calculating the offset value using information about the width of the interpolated enable signal received from the interpolator and the ideal width of the write enable signal.

16. The optical disc drive as claimed in claim 9, wherein the optical disc drive receives data to be written on an optical disc and the plurality of control data from a host.

17. An article of manufacture having a machine-accessible medium including data that, when accessed by a machine, cause the machine to perform a method of correcting writing strategies for recording data on an optical recording medium, the method comprising:

setting initial values including a data write rate to be applied to an optical write device, a number of write strategy data, a maximum number of steps of a time parameter to be applied to the write strategy data, and step sizes of the steps in the time parameter, and generating a modulated signal;

generating a write enable signal whenever the time parameter is varied by a step size, and measuring and storing a width of the generated write enable signal; and calculating an offset correction value for correcting an offset value corresponding to a difference between the stored width of the write enable signal end a predetermined value of the write enable signal, wherein the write strategy data includes information about a difference between the modulated signal and the write enable signal, and the time parameter varies the information included in the write strategy data.

18. The method as claimed in claim 17, wherein the measuring and storing the width of the write enable signal includes:

setting a first variable i to 1;

setting a second variable j to 1;

setting a value of a jth step of an if ith time parameter, MTD(i,j), to 0;

generating the write enable signal using the modulated signal and MTD(i,j);

measuring the width of the write enable signal;

storing the measured width of the write enable signal;

setting the second variable j to j+1;

determining whether the second variable j is larger than the maximum number N of time parameter steps;

setting the value of the time parameter step MTD(i,j) to MTD(i,j+1)+S(i), where S(i) is the step size for ith time parameter, when the second variable j is less than or equal to N, and then returning to the generating the write enable signal;

setting the first variable i to i+1 when the second variable j is larger than N; and determining whether the first variable i is larger than the number M of write strategy data, proceeding to store the offset correction value when the first variable i is greater than M and proceeding to set the second variable j to 1 when the first variable i less than or equal to M.

19. The optical disc drive as claimed in claim 9, wherein the write strategy data is information about a time difference between the modulated signal and the write enable signal.

20. The method as claimed in claim 17, wherein the write strategy data is information about a time difference between the modulated signal and the write enable signal.

* * * * *